May 16, 1944.   S. KIESSKALT ET AL   2,349,098
PROCESS OF ADSORBING GASES AND VAPORS
Filed Jan. 3, 1941   2 Sheets-Sheet 1

SIEGFRIED KIESSKALT, ERICH KRUTA
HERBERT QUEDNAU AND FRANZ PATAT
INVENTORS
BY THEIR [signature]
ATTORNEYS May 16, 1944.    S. KIESSKALT ET AL    2,349,098
PROCESS OF ADSORBING GASES AND VAPORS
Filed Jan. 3, 1941    2 Sheets-Sheet 2
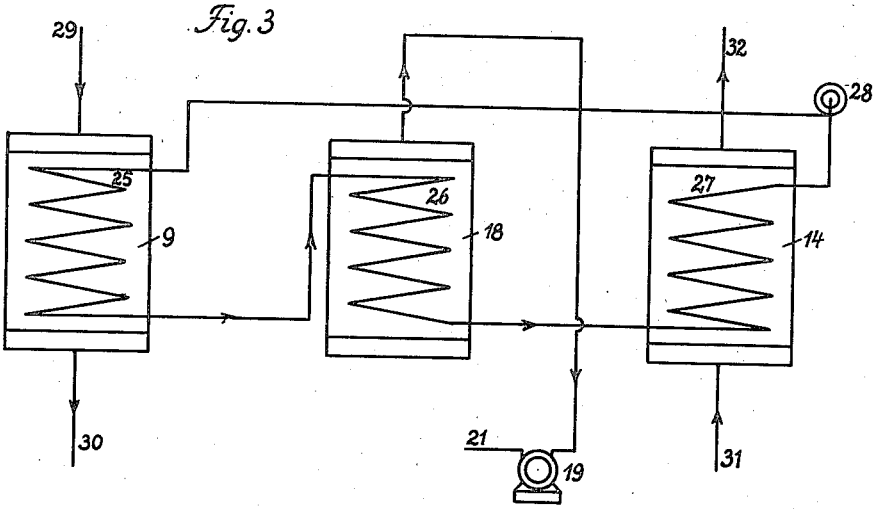
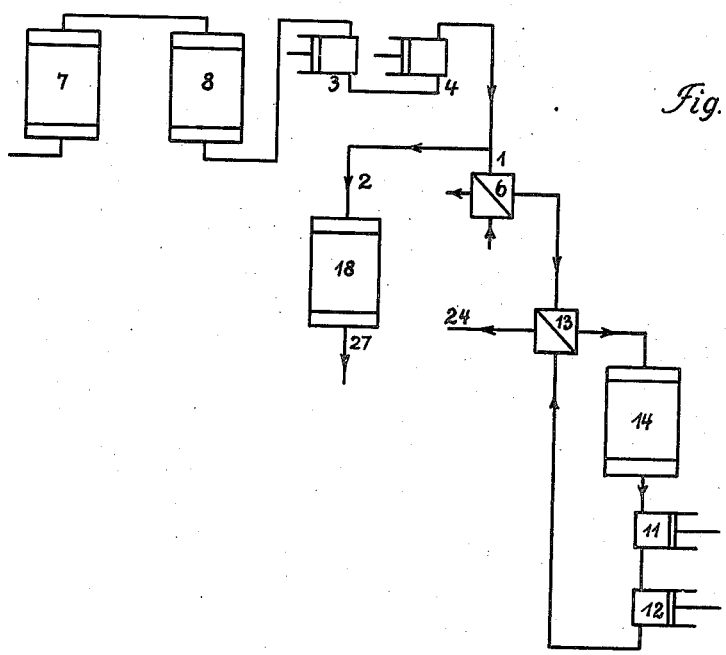
SIEGFRIED KIESSKALT, ERICH KRUTA,
HERBERT QUEDNAU AND FRANZ PATAT
INVENTORS
BY THEIR
ATTORNEYS Patented May 16, 1944

2,349,098

UNITED STATES PATENT OFFICE 2,349,098

PROCESS OF ADSORBING GASES AND VAPORS

Siegfried Kiesskalt, Erich Kruta, Herbert Quednau, and Franz Patat, Frankfort-on-the-Main, Germany; vested in the Alien Property Custodian Application January 3, 1941, Serial No. 373,012
In Germany January 27, 1940

5 Claims. (Cl. 183—114.2)

The co-pending U. S. patent application Serial No. 360,291 filed on October 8, 1940, in the name of Siegfried Kiesskalt, relates to a method of obtaining valuable gaseous or liquid substances from a mixture of gases by cooling the mixture under pressure within a cold gas machine while employing adsorbing agents. Cold gas machines have hitherto not been applied with success in practice, but according to the process described in the afore-named application a surprising effect is attained by very high additional adsorptions even if a large portion of the gas has a low percentage of the gas to be removed. The process, therefore, operates in an economical manner. By the displacement of the adsorption in the pressure sphere by means of a cooling process simultaneously produced therewith of the entire portion of gas, adsorption isotherms are obtained which within the operating range are substantially straight lined and steep, i. e., there exists an optimum of the cooling and of the increase in pressure. The adsorption process thus operates in the most economical manner.

On further investigating the afore-named process we have now found that it may be desirable to operate the adsorption process in several stages, in each of which a different pressure and/or temperature is employed. By so doing, substantial economies are obtained in refrigeration and a saving in excess of 30% in energy requirements is obtained. There are also certain minor thermodynamic advantages and a slight improvement in utilization of the machines.

The invention is diagrammatically illustrated by way of example in the accompanying drawings in which:

Fig. 3 is a diagrammatic illustration of a heat exchange circuit for the adsorbers; and Fig. 4 is a diagrammatic illustration of a method of enriching a gas in accordance with the present invention.

Figure 1:
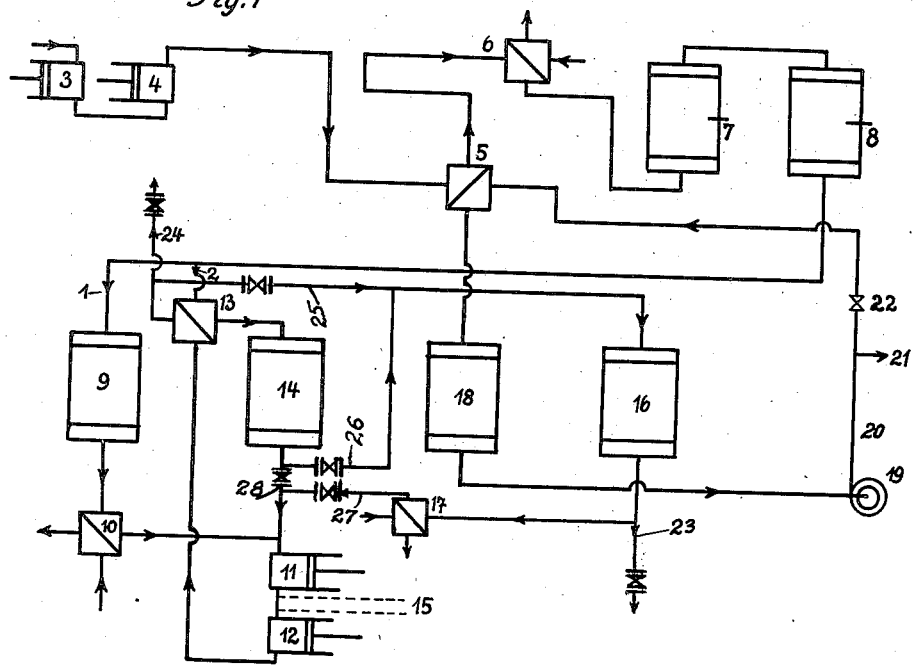
Fig. 1 is a diagrammatic representation of apparatus suitable for practicing the present invention in which the same pressure is employed in both stages, but different temperatures are employed in each of the adsorption zones.

In Fig. 1 there is illustrated, by way of example, a two stage adsorption process in which the same pressure is employed in both stages, but different temperatures are employed in each of the adsorption stages. For the purpose of illustration, this operation will be specifically described in connection with the separation of ethylene from illuminating gas. Said process consists in first compressing the entire volume of gas in compressors 3 and 4, removing the heat of compression by flowing the gas through a heat exchanger 5 and a cooling device 6 and eliminating the entrained benzene by flowing the gas at an elevated pressure and at ordinary temperature through an active carbon-plant 7. The active carbon-plant 7 may, if desired, be replaced by a washing oil-plant which may be operated under pressure at ordinary temperature. The gas is then dried by flowing it through a dryer 8. The dried gas leaving dryer 8 is divided into two currents, one of which flows through line 1, while the other flows through line 2. The relative proportion of the two currents is predetermined in accordance with the heat of adsorption which is set free in the various stages.

The current of gas flowing through line 1 is introduced at a selected elevated pressure and at a temperature which approximates the temperature of the cooling water, into an adsorber 9 which contains active carbon and acts as a preliminary adsorbing device. In said adsorber 9 the hydrocarbons to be adsorbed are removed from the gas current at a rate in correspondence with the operating pressure and an average temperature which increase, in correspondence with the heat of adsorption, above the temperature of the cooling water; the adsorbing operation is continued until the adsorbing means are saturated, i. e. until no more material is adsorbed. The heated current of residual gas free of the desired constituent, ethylene, which leaves the adsorber 9, is passed to a cooling device 10 where it is allowed to cool until it has reached the temperature of the cooling water and thence flows to expansion devices 11 and 12 wherein it is expanded and cooled. The expansion devices 11 and 12, according to the size of the plant and the pressure chosen, may be constructed as a piston engine, a rotary machine or a turbo machine, in one stage or in several stages.

The current of gas flowing through line 2 from the drying plant 8 flows through heat exchanger 13 wherein it is cooled at the operating pressure to a temperature below ordinary temperature according to the process described in the aforenamed application by indirect heat exchange with the cooled residual gas from expansion devices 11 and 12. It is then led to a secondary adsorber 14 which in a previous operation has been preliminarily charged or saturated at a raised pressure and at ordinary temperature in the same manner as the adsorber 9 and now acts as a subsequent adsorbing device. Since the adsorber 14 now operates as a secondary adsorber to which gas at a temperature below ordinary temperature is introduced, it is capable of adsorbing additional quantities of the desired constituent, ethylene, which it is desired to remove from the gas.

The residual gas, i. e. illuminating gas freed of ethylene, which leaves adsorber 14, is combined with the residual gas from adsorber 9 and the combined stream flows to expansion devices 11 and 12 and is therein expanded and cooled, the energy released being used, if desired, to furnish part of the energy requirements for operating the compressors 3 and 4. If desired, heating means may be provided between the two expansion devices 11 and 12, for instance at the zone 15 noted on the drawings, such heating, however, is not necessary. The cooled gas leaving expansion device 12 flows to heat exchanger 13 wherein it cools the current of gas flowing through line 2 to adsorber 14. The cooled current of residual gas from expansion device 12 after leaving heat exchanger 13 is preferably introduced into an adsorber, illustrated in the drawings as adsorber 16, which has previously been heated to regenerate the adsorbent as hereinafter more fully described. In passing through adsorber 16, the residual gas charges the adsorbent therein with methane. When adsorber 16 is again used as a preliminary adsorber for the raw gas mixture, the methane is displaced by the ethylene in the raw gas. The charging of adsorber 16 with methane prior to its use as a preliminary adsorber is advantageous, since when it is so charged only a slight heat differential occurs during the adsorption of the ethylene. The heat of the adsorption of the ethylene in this case being substantially completely compensated for by the heat required to displace the methane. The residual gas after passing through adsorber 16 may be removed from the system through line 23.

The residual gas freed of ethylene and which flows from adsorber 14 may be employed while it is still under pressure and before passing through the expansion machines 11 and 12 for cooling and charging the adsorber 16. When this operation is desired, the valves in line 28 and 25 may be closed and the valves in lines 26 and 27 opened. The valve in line 23 should also be closed while the valve in line 24 is opened. By so doing, the residual gas from the absorber flows through lines 26 and 25 to adsorber 16 wherein it charges the adsorbent, a substantial amount of methane being adsorbed. The heat of adsorption is removed from the gas flowing through line 27 by flowing the gas through heat exchanger 17. On leaving heat exchanger 17, the residual gas is mingled with the residual gas from adsorber 9 and the combined current introduced into expansion devices 11 and 12 as heretofore described. The cooled residual gas from expansion devices 11 and 12 flows to cooler 13 and may then be removed from the system through line 24. If said adsorber 16 is inserted again into the path of the fresh gas still containing the substance which is to be obtained, the methane is removed from the adsorbing means and the ethylene is adsorbed, but a particular heat differential is not produced. The process, therefore, involves the advantage that a drop in temperature is produced by the total quantity of gas; said drop has, however, to cool only part of the current, for instance half of the gas introduced. Thus, by operating in accordance with the present invention, it is possible to attain substantially lower temperature and use substantially smaller adsorbers which are much more highly charged than is possible in the process described in the aforementioned application.

After an adsorber has acted as a secondary adsorber in the manner described in connection with adsorber 14, it is necessary to regenerate the adsorber. In order to simplify the description, the method of regeneration and apparatus necessary for effecting the same, is described only in connection with adsorber 18. It is to be understood, however, that each of the adsorbers 9, 14, 18 and 16 may be regenerated in a like manner. As illustrated in the drawings, the ethylene adsorbed in adsorber 18 is removed therefrom by pump 19 and pumped through line 20 to heat exchanger 5 wherein it is heated by indirect heat exchange with the hot gases from compressor 4. The heated ethylene is returned to adsorber 18, thereby heating the adsorbent therein and causing additional quantities of ethylene to be released, the ethylene is recycled in this manner until substantially all of the ethylene has been released from the adsorber. In case the pressure during regeneration cycle exceeds desired pressure, a portion of the ethylene may be withdrawn through line 21 either continuously or intermittently. When the adsorbent in adsorber 18 has been substantially completely regenerated, valve 22 may be closed and the valve in line 21 opened and ethylene removed from the system by pump 19.

Figure 2:
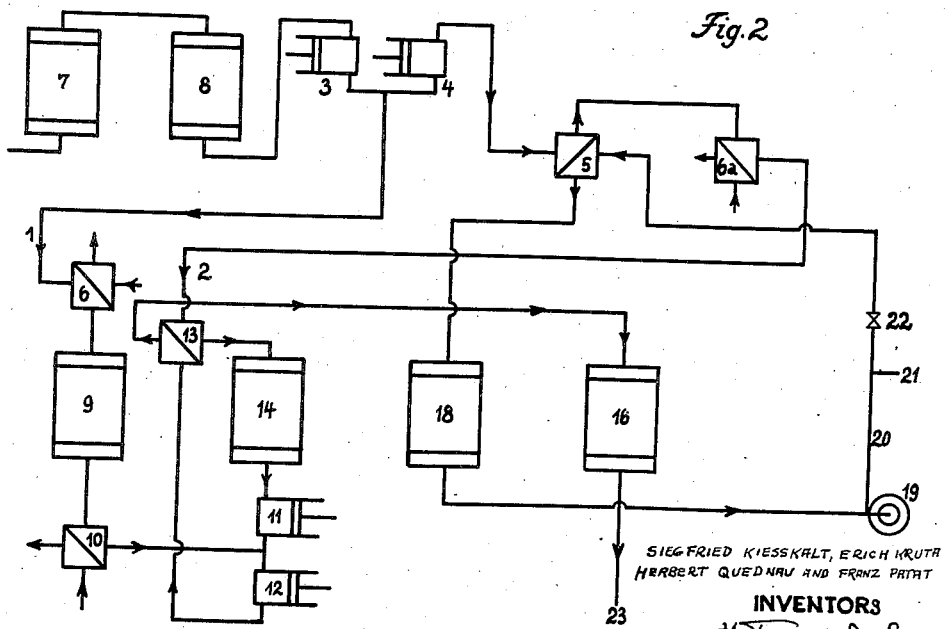
Fig. 2 is a diagrammatic illustration of apparatus suitable for practising the present invention in which different pressures are employed in each of the two adsorption zones.

A further improvement in comparison with the afore-named application may be attained by operating the several adsorption stages under different pressures, as is diagrammatically illustrated in Figure 2. This operation is as follows: The raw gas may be stripped of benzene in adsorber 7 and dried in dryer 8 before being introduced into compressor 3. In compressor 3, the gas may be compressed to approximately 4 atmospheres absolute. The gas leaving compressor 3 is split into 2 currents, one of which flows through line 1 to heat exchanger 6 wherein it is cooled to substantially cooling water temperature. From heat exchanger 6, the raw gas flows to adsorber 9 wherein the desired constituent, ethylene, of the gas is adsorbed. From adsorber 9, the residual gas freed of ethylene flows to heat exchanger 10 wherein the heat of adsorption is removed. From heat exchanger 10, the cooled residual gas flows to the second stage 12 of expansion devices 11 and 12. The other portion of the gas from compressor 3 flows to compressor 4 wherein it is further compressed to a pressure of 9 atmospheres absolute and flows at such pressure to cooler 5 and heat exchanger 6—a, and is therein cooled to a temperature approximating cooling water temperature. From cooler 6—a, the gas flows through line 2 to cooler 13 wherein it is cooled to a temperature below cooling water temperature and thence flows to adsorber 14 wherein the desired constituent of the gas, ethylene, is adsorbed. From adsorber 14, the residual gas freed of ethylene flows to the first stage 11 of expansion devices 11 and 12 and is therein expanded and cooled. The partially cooled gas leaving expansion device 11 is mingled with the cooled gas from heat exchanger 10 and the combined current flows to the second expansion stage 12 wherein it is further expanded and cooled and thence flows to cooler 13 wherein it cools the current of gas flowing through line 2. From cooler 13, the residual gas flows to adsorber 16 and it is therein employed for charging the adsorbent. The remainder of the operation is similar to that described in connection with Figure 1 and need not be further described here.

While, for the purpose of simplifying the present description, each of the adsorbers 9, 14, 16 and 18 have been described as being used in only one step of our process, it should be understood that the several adsorbers are operated in sequence. The complete cycle for each of the adsorbers being first as a preliminary adsorber in which it functions in the manner described in connection with adsorber 9 and then as a secondary adsorber wherein it is operated as specifically described in connection with adsorber 14, then the adsorbent in the adsorber is regenerated as described specifically in connection with adsorber 18 and the regenerated adsorbent is then charged with methane as described in connection with adsorber 16. Thus, in practical operation of our process suitable manifolds will be provided so that each of the steps of our process may be practiced in each of the adsorbers in sequence.

The higher charging of the adsorbent with gas in the secondary adsorber 14, which is made possible by operating in accordance with our improved method, also permits the regeneration of the adsorbent by a mere release of pressure or preferably by applying a vacuum, thereon. If a strong cooling occurs in the discharge adsorber 18, by which cooling a delay would be caused, a heat exchange circuit may suitably be provided for the three adsorbers, i. e. the preliminary adsorber 9, the additional adsorber 14 and the discharge adsorber 18, by coils or other interchanging elements. Said circuit likewise permits of an improvement in the energy economy and an improved utilization of the apparatus. As illustrated in Fig. 3, the coils 25, 26 and 27 inserted in the three adsorbers 9, 18 and 14 are mounted in the cycle in such a manner that the carrier liquid, suitably methanol which will not freeze, is conducted into adsorber 18 which is to be discharged. The carrier liquid transfers heat from adsorber 9 to adsorber 18 wherein the liquid is cooled. For completing the cycle the methanol then passes the coils of the additional adsorber 14; the decrease of the temperature in the adsorber 18 in comparison to adsorber 14 is thus again rendered utilizable. The carrier liquid is moved by a pump 28. Arrow 29 demonstrates the inlet, arrow 30 the outlet of the gas from the adsorber 9, arrow 31 the inlet and arrow 32 the outlet of gas from the adsorber 14; 19 is a pump for exhausting the desired constituent which has been adsorbed from the adsorber 18 and remove it from the system through line 21.

In cases where no complete separation, but only an enrichment of the material to be obtained, for instance ethylene, is desired, the heat required for the regeneration can be taken from the heat of compression. The compressed mixture of gases is subdivided, as illustrated in Fig. 4, into two parts. After the benzene has been removed at 7 and the fresh gas has been dried at 8, the latter is compressed by compressors 3 and 4. The current of gas is then subdivided. The heat of compression of current 1 is removed by passing it through a water cooling device 6. After having passed the cold exchanger 13 current 1 is conducted over active carbon in the adsorber 14 and the ethylene is eliminated. When the adsorbent in adsorber 14 is saturated, it may be regenerated and the adsorbed ethylene released by introducing the hot compressed gas flowing to line 2 into adsorber 14 and removing the gas through line 21. The originally adsorbed ethylene is thus transferred into the current 2, i. e. into a smaller total portion of gas. Current 1 free from ethylene is suitably expanded at 11 and 12 in the same manner as shown in Fig. 1. The cooling occurring thereby may be utilized in the cold exchanger 13.

The method of operation herein described may be used with advantage in the various pressure stages of a plant for the liquefaction of gas. There is thus attained that the higher and economically more expensive pressure stages have to overcome only a fraction of the initial portion of gas. This is of particular importance if a large quantity of waste gas is carried along which cannot or must not be liquefied.

If from the very beginning compressed gas is present for use, for instance a gas from a long distance gas supply and if it is intended to operate with a gas enriched in the substance to be obtained or with a mixture of gases under atmospheric pressure it is suitable to regenerate with a gas under atmospheric pressure. For this purpose current 2 is expanded and allowed to pass through a heat exchanger in heat exchange relationship to current 1 or to a cooling liquid which is conducted through an adsorber. After the adsorber has been charged by current 1, current 2 is used for regeneration. Current 2 is thus enriched in the substance to be obtained. The expansion cold of current 1 may also be used for a higher additional charge if the volume of the apparatus is decreased. It is, of course, also possible to perform the same process by starting with gas which is under normal pressure. In that case only current 1 is compressed, whereas current 2 is directly used for desorption.

By all the process herein described it is intended by a suitable selection of pressure and temperature, to displace the adsorption as much as possible into the steep, substantially straight-lined branches of the adsorption iso-therms. It is, therefore, no fundamental modification of the present invention if an adsorber through which a liquid, for instance a washing oil, is caused to trickle is used instead of an adsorber filled with active carbon or silica gel.

We claim:

1. The method of removing desired constituents from a mixture of gases and vapors containing the same which comprises subjecting said mixture to the steps of compression and cooling at least one of said steps being performed in a plurality of stages, withdrawing a portion of said mixture at an intermediate stage in said compression and cooling steps and flowing the same as a first current through a preliminary adsorption zone, wherein said desired constituents are removed from said mixture, withdrawing a current of residual gas freed of said desired constituents from said preliminary adsorption zone; flowing a second current of said mixture from the final stage of said compression and cooling steps through a secondary adsorption zone which has previously been saturated as a preliminary adsorption zone, whereby said secondary adsorption zone removes said desired constituents from additional amounts of said mixture, withdrawing a current of residual gas freed of said desired constituents from said secondary adsorption zone, expanding said currents of residual gas in an expansion machine to thereby cool said gas and generate power, and flowing the thus cooled gas in heat exchange relation with said mixture in the cooling step specified, removing said desired constituent from said secondary adsorption zone when said constituent is no longer removed from said mixture therein, using said preliminary adsorption zone as a secondary adsorption zone when said desired constituent is no longer removed from said first current therein, and using said secondary adsorption zone as said preliminary adsorption zone after removal of said desired constituents therefrom.

2. The process described in claim 1 in which said secondary adsorption zone before it is used as said preliminary adsorption zone is preliminarily charged with gas by flowing said residual gas freed of said desired constituents therethrough after removal of said desired constituent therefrom.

3. The method of removing desired constituents from a mixture of gases and vapors containing the same, which comprises compressing said mixture, cooling said mixture in two stages, withdrawing a portion of said mixture between the first and second of said cooling stages and flowing the same as a first current through a preliminary adsorption zone, wherein said desired constituents are removed from said mixture, withdrawing a current of residual gas freed of said desired constituents from said preliminary adsorption zone; flowing a second current of said mixture from the final stage of said cooling stages through a secondary adsorption zone which has previously been saturated as a preliminary adsorption zone, whereby said secondary adsorption zone removes said desired constituents from additional amounts of said mixture, withdrawing a current of residual gas freed of said desired constituents from said secondary adsorption zone, expanding said currents of residual gas in an expansion machine to thereby cool said gas and generate power, and flowing the thus cooled gas in heat exchange relation with said mixture in one of the cooling stages specified, removing said desired constituent from said secondary adsorption zone when said constituent is no longer removed from said mixture therein, using said preliminary adsorption zone as a secondary adsorption zone when said desired constituent is no longer removed from said first current therein, and using said secondary adsorption zone as said preliminary adsorption zone after removal of said desired constituents therefrom.

4. The method of removing desired constituents from a mixture of gases and vapors containing the same, which comprises compressing said mixture in two stages, withdrawing a portion of said mixture between the first and second compression stage, cooling the thus withdrawn portion and flowing the same as a first current through a preliminary adsorption zone, wherein said desired constituents are removed from said mixture, withdrawing a current of residual gas freed of said desired constituents from said preliminary adsorption zone; flowing a second current of said mixture from the final stage of said compression stages at a relatively high pressure as compared with the pressure of said first current, cooling the same and then blowing said second current through a secondary adsorption zone which has previously been saturated as a preliminary adsorption zone; whereby said secondary adsorption zone removes said desired constituents from additional amounts of said mixture, withdrawing a current of residual gas freed of said desired constituents from said secondary adsorption zone, expanding said currents of residual gas in an expansion machine to thereby cool said gas and generate power, and flowing the thus cooled gas in heat exchange relation with said mixture in one of the cooling stages specified, removing said desired constituent from said secondary adsorption zone when said constituent is no longer removed from said mixture therein, using said preliminary adsorption zone as a secondary adsorption zone when said desired constituent is no longer removed from said first current therein, and using said secondary adsorption zone as said preliminary adsorption zone after removal of said desired constituents therefrom.

5. The method of removing desired constituents from a mixture of gases and vapors containing the same, which comprises compressing said mixture in two stages, withdrawing a portion of said mixture between the first and second compression stage and cooling the same and flowing the thus cooled portion as a first current through a preliminary adsorption zone wherein said desired constituents are removed from said mixture, withdrawing a current of residual gas, freed of said desired constituents, from said preliminary adsorption zone; flowing a second current of said mixture at a relatively high pressure as compared to the pressure of said first mentioned current from the final stage of said compression step and cooling the same to a lower temperature than said first mentioned current, flowing said second current through a secondary adsorption zone which has previously been saturated as a preliminary adsorption zone, whereby said secondary adsorption zone removes said desired constituents from additional amounts of said mixture, withdrawing a current of residual gas freed of said desired constituents from said secondary adsorption zone, expanding said currents of residual gas in an expansion machine to thereby cool said gas and generate power, and flowing the thus cooled gas in heat exchange relation with said mixture in one of the cooling stages specified, removing said desired constituent from said secondary adsorption zone when said constituent is no longer removed from said mixture therein, using said preliminary adsorption zone as a secondary adsorption zone when said desired constituent is no longer removed from said first current therein, and using said secondary adsorption zone as said preliminary adsorption zone after removal of said desired constituents therefrom.

SIEGFRIED KIESSKALT.
ERICH KRUTA.
HERBERT QUEDNAU.
FRANZ PATAT.